United States Patent [19]

Gross

[11] 4,267,579

[45] May 12, 1981

[54] DIGITAL WAVEFORM GENERATOR HAVING CONSTANT SIGNAL TO NOISE RATIO

[75] Inventor: Glenn M. Gross, Chicago, Ill.

[73] Assignee: Norlin Industries, Inc., Deerfield, Ill.

[21] Appl. No.: 57,187

[22] Filed: Jul. 13, 1979

[51] Int. Cl.³ .......................... G06F 1/02; G06F 15/34
[52] U.S. Cl. .................................................. 364/718
[58] Field of Search ............... 364/718, 719, 720, 721, 364/722; 328/14; 340/347 DD; 179/1 SM

[56] References Cited

U.S. PATENT DOCUMENTS

| | | | |
|---|---|---|---|
| 3,763,364 | 10/1973 | Deutsch et al. | 364/718 |
| 3,898,448 | 8/1975 | Clark | 364/718 |
| 4,159,527 | 6/1979 | Yahata et al. | 364/721 |

Primary Examiner—David H. Malzahn
Attorney, Agent, or Firm—Jack Kail; Ronald J. Kransdorf

[57] ABSTRACT

An electronic musical instrument includes a p-bit memory sequentially storing the resolution contributing bits of a sequence of n-bit samples, the n-bit sequence representing a percussive-type waveform. The p-bit memory is sequentially addressed with each stored sample being suitably scaled for reestablishing the magnitudes of the corresponding n-bit samples, the scaled samples being coupled through a digital to analog converter for producing an output signal representing the percussive waveform and having a uniform signal to quantizing noise ratio.

14 Claims, 8 Drawing Figures

FIG. 2A
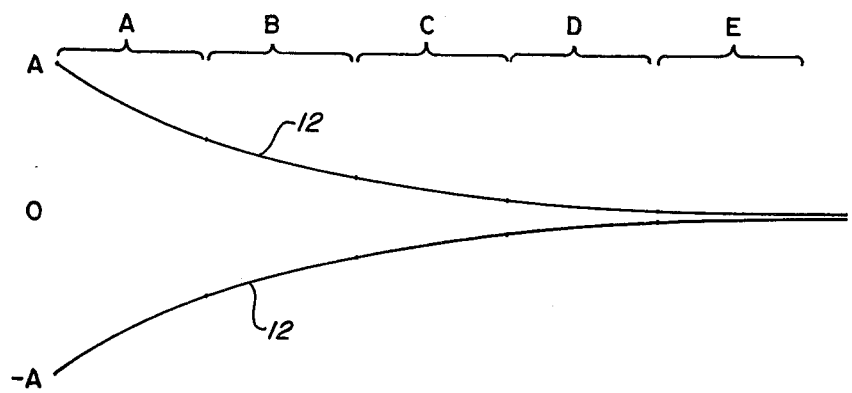
FIG. 2B
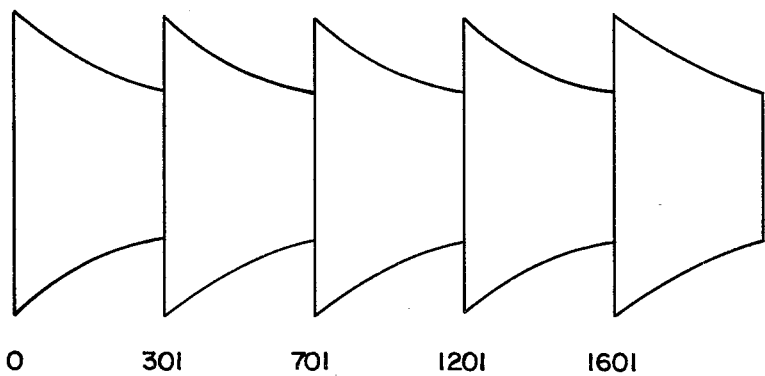
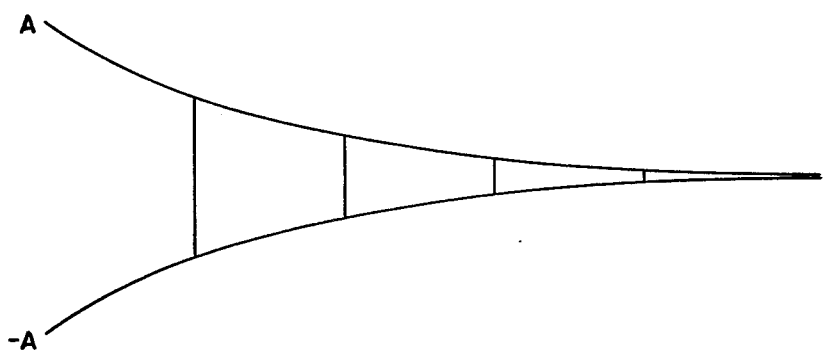
FIG. 2c

FIG. 4
| ADDRESS | OUTPUT TO COMPARATOR ON BUS 42 | OUTPUT TO SCALER ON BUS 30 |
|---------|-------------------------------|----------------------------|
| 000 | 301 | 000 |
| 001 | 701 | 001 |
| 010 | 1201 | 010 |
| 011 | 1601 | 011 |
| 100 | 2500 | 100 |
FIG. 5
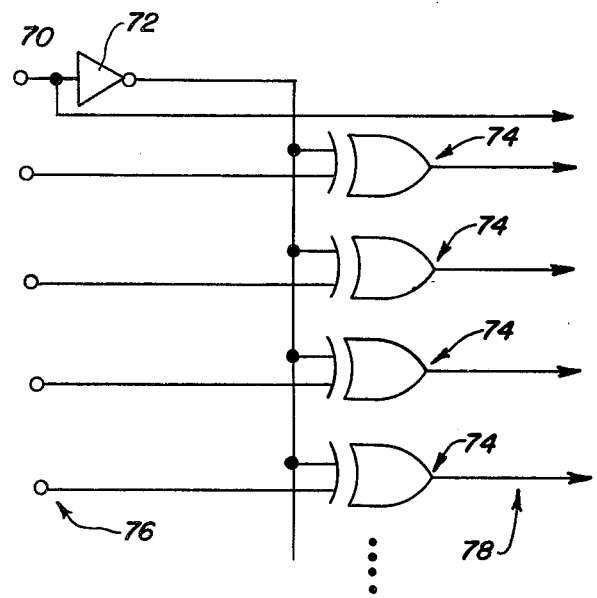
FIG. 6
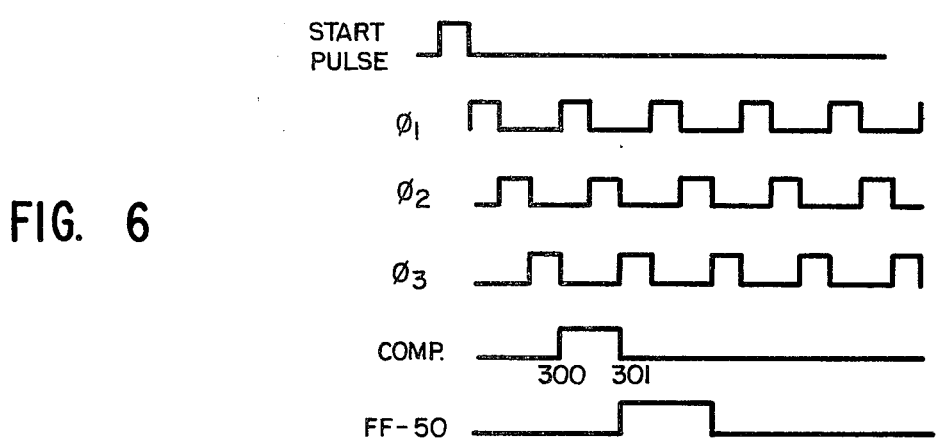

DIGITAL WAVEFORM GENERATOR HAVING CONSTANT SIGNAL TO NOISE RATIO

BACKGROUND OF THE INVENTION

The present invention relates to methods and apparatus for digitally storing and reconstructing analog waveforms and, more particularly, to an electronic musical instrument using such apparatus and methods for generating audio waveforms which are percussive in nature having an envelope which decays gradually with time.

It is known to construct an electronic musical instrument using a digital memory in which an audio waveform is stored in a sampled form. The stored audio waveform is conventionally read out of the memory at a constant rate in response to an address counter and is then converted to an analog form by a digital to analog converter. The analog signal may subsequently be used to supply or drive a suitable output system for producing a corresponding musical tone.

In systems of the foregoing type, it is desirable to store the digital samples using as few binary bits as possible in order to minimize the cost of the memory. Thus, in the case of periodic waveforms, it is common to store digital samples defining only one period of the waveform, the remainder of the waveform being derived through calculations performed on the stored samples. Audio waveforms which are not periodic in nature, such as complex percussive waveforms which decay gradually with time, cannot, however, be treated in this manner. In particular, in order to faithfully reproduce such waveforms using the sequential sampling technique described above, it is necessary to store substantially the entire waveform in sampled form.

The signal to quantizing noise ratio characterizing sequentially sampled systems of the foregoing type is given by the expression 20 log (% of full scale used $\times 2^n$), where n is the number of bits characterizing the system. In other words, the signal to quantizing noise ratio is proportional to the word length of the memory and to the percentage of the full dynamic range of the word length use. Thus, for example, increasing the word length by one bit will raise the ratio by 6 db whereas reducing the wavefrom from full scale to half scale will decrease the ratio by 6 db. Therefore, in the case of a percussive waveform, the signal to noise ratio will continuously decrease as the waveform decays.

It has heretofore been considered necessary to use at least 12-bit word lengths in order to achieve an adequate signal to noise ratio (72 db for most audio waveforms) in sequentially samples systems of the foregoing type. It is a primary object of the present invention to provide a technique, which is particularly useful in association with percussive type waveforms, whereby the bit word length used by the memory may be substantially reduced from this number without adversely affecting the average signal to noise ratio characterizing the lower level signals.

SUMMARY OF THE INVENTION

According to the present invention, a method and apparatus are disclosed using a p-bit memory for forming a representation of a percussive-type waveform having a gradually decaying or increasing envelope wherein the lower level signals are formed having a signal to noise ratio consistent with an n-bit system, where n is greater than p.

More specifically, in accordance with the invention, a selected percussive-type waveform is initially sampled for producing a sequence of n-bit binary samples representative thereof. The sequence is grouped into a plurality of portions $A_0$–$A_m$ equal in number to n-p+1, with each portion representing a segment of the envelope of the percussive waveform having normalized amplitudes ranging between $\frac{1}{2}^m$ and $\frac{1}{2}^{m+1}$, where m takes on consecutive integer values beginning with 0. The samples of each portion $A_o$–$A_m$ are then shifted m places to the left, where m takes on values as above, and the p most significant bits of each shifted n-bit sample is stored in a p-bit memory. As a result of the foregoing shifting operation, only the resolution contributing bits of the original n-bit samples are stored in the memory. In order to reconstruct the waveform, the p-bit words are sequentially read from the memory and converted to n-bit words by adding n-p zero value least significant bits to each p-bit word. The resulting n-bit words are shifted m places to the right so as to reestablish the magnitudes of the corresponding original n-bit samples and then coupled through a digital to analog converter at whose output is developed a representation of the percussive waveform.

BRIEF DESCRIPTION OF THE DRAWINGS

FIGS. 2A–2C graphically represent the waveform of FIG. 1, the manner by which the waveform of FIG. 1 is stored according to the invention and the waveform reconstructed from the stored waveform respectively.

FIG. 4 illustrates the method of programming the shift point memory of the circuit of FIG. 3.

FIG. 5 is a schematic diagram illustrating a code converter useful with the present invention.

FIG. 6 graphically depicts a series of waveforms pertinent to the operation of the circuit of FIG. 3.

DESCRIPTION OF THE PREFERRED EMBODIMENT

Figure 1:
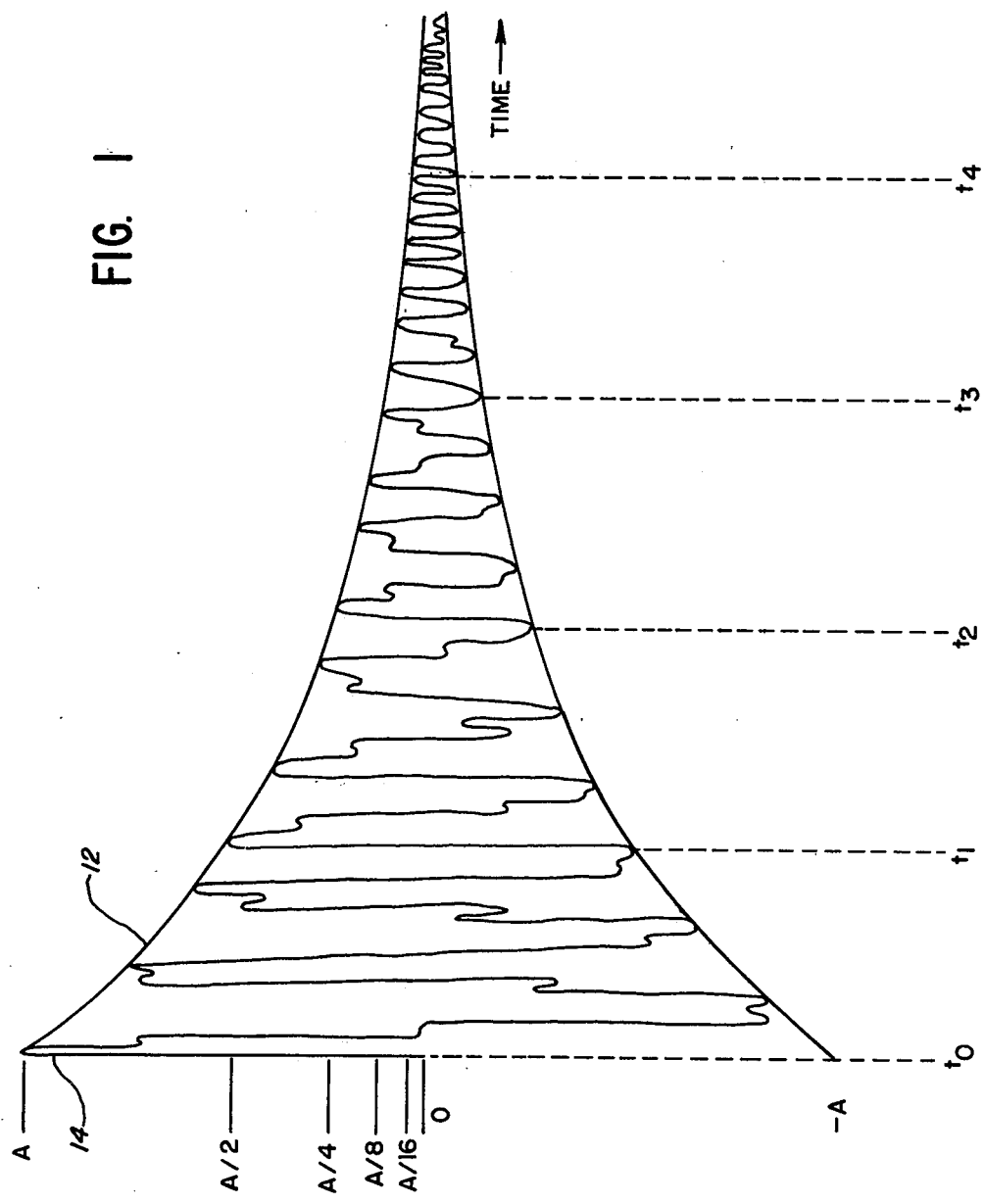
FIG. 1 graphically illustrates a complex percussive-type waveform having a gradually decaying envelope.

Referring now to the drawings, FIG. 1 graphically represents a typical percussive waveform which comprises a gradually decaying envelope 12 amplitude modulating a complex audio signal 14. The envelope 12, which normally has a time duration on the order of about 2 to 3 seconds, is characterized by a maximum amplitude A at time to which decays to a value of A/2 at time $t_1$. At time $t_2$, the amplitude of the envelope 12 is A/4 and at time $t_3$ A/8. Finally, at time $t_4$, the envelope 12 had decayed to the value A/16. Although the operation of the present invention will be described herein largely in relating to the specific waveform illustrated in FIG. 1, it is to be understood that the principles of the invention are not limited thereto. Thus, for example, the advantages achievable through implementation of the invention are equally applicable to complex audio signals whose amplitudes increase gradually with time or to sections or portions of audio signals which gradually decay or increase with time.

As hereinbefore discussed, in order to achieve an adequate signal to quantizing noise ratio when sampling a waveform such as that illustrated in FIG. 1, it has heretofore been considered necessary to utilize at least 12-bit words to provide adequate resolution for the lower level signals. The use of 12-bit words, of course, necessitates the use of a 12-bit memory the cost of which, in relative terms, is rather high. The present invention provides a method and apparatus by which a waveform such as that illustrated in FIG. 1 may be digitally represented in terms of, for example, 8-bit memory words without adversely affecting the resulting average signal to noise ratio for the lower level signals as compared to that characterizing a 12-bit system. As a consequence, an 8-bit memory may be used thereby significantly reducing the costs of the system.

Before undertaking a detailed description of the invention, it will be useful to initially relate its major aspects in a more generalized or summary form. Proceeding to this end, a digital representation of the waveform of FIG. 1 is initially prepared in terms of a sequence of 12-bit binary words. The sequential representation may be prepared by hand or, more preferably, through the facility of a suitably programmed digital computer. In either case, the representation of the waveform is prepared by taking a plurality of equally spaced samples of the audio signal 14 and representing each of the samples in terms of a corresponding 12-bit binary number. Thus, assuming the use of modified sign-magnitude notation wherein the most significant bit of each binary word represents the polarity of the sampled signal (a logical 1 representing a positive signal and a logical 0 a negative signal) with the remaining bits representing the magnitude of the signal, the binary words representing the signal 14 between times $t_0$ and $t_1$ take the form XXXXXXXXXXXX, where X represents either a logical 1 or a logical 0, with the maximum and minimum values of the samples having the binary representations 111111111111 and 011111111111 respectively. The binary samples between time $t_1$ and $t_2$ then take the form X0XXXXXXXXXX while between times $t_2$ and $t_3$ the binary samples take the form X00XXXXXXXXX. Between the times $t_3$ and $t_4$ the 12-bit binary samples take the form X000XXXXXXXX and subsequent of time $t_4$ the binary samples take the form X0000XXXXXXX.

Ignoring for the moment the sign bit of each of the 12-bit samples, it will be observed that the four most significant bits of each sample subsequent of time $t_4$ are characterized by 0 values which do not contribute to the resolution of the sample. Similar observations will be made for the preceding samples except that the number of zero value most significant bits decrease as the amplitude of the envelope 12 increases. This characteristic of the 12-bit binary samples is advantageously exploited by the invention by storing in an 8-bit memory only the resolution contributing bits of the 12-bit samples representing the lower levels of the signal 14.

More specifically, prior to storing the sampled waveform, each of the 12-bit binary samples is multiplied by a suitable factor, or shifted a number of places to the left, such that the resolution contributing bits of the signals are shifted to the most significant bit positions of the products. For example, the 12-bit samples representing the signal 14 subsequent of time $t_4$ are all multiplied by a factor of 16, i.e. shifted four places to the left, wherein the products take the form of XXXXXXXX0000. The 12-bit signals representing the signal 14 between times $t_3$ and $t_4$ are multiplied by a factor of 8, i.e. shifted three places to the left, and assume the form XXXXXXXXX000 while the samples between times $t_2$ and $t_3$ are multiplied by a factor of 4, shifted two places to the left, and take the form XXXXXXXXXX00. The 12-bit samples between times $t_1$ and $t_2$ are multiplied by a factor of 2, shifted one place to the left, and assume the form XXXXXXXXXXX0 and the samples between times $t_0$ and $t_1$ are all multiplied by a factor of one so that their form remains unchanged. The four least significant bits of each of the multiplied 12-bit samples is then dropped and the remaining 8-bit words are sequentially stored in a suitable 8-bit memory. In this regard, it will be appreciated that the effect of the foregoing is that of dividing each of the multiplied 12-bit samples by a factor of 16. Moreover, it will be seen that each of the stored 8-bit samples is now completely characterized by resolution contributing bits.

The signal 14 is subsequently reconstructed by sequentially reading from the memory the stored 8-bit samples. During this reconstruction process, each of the stored 8-bit samples is converted to a corresponding 12-bit signal by effectively adding to each 8-bit sample four logical 0 least significant bits and then dividing, or shifting to the right, the 12-bit signals by suitable factors to reestablish the relative magnitudes of the originally tabulated 12-bit samples. For example, the stored 8-bit samples read from the memory and representing the audio signal 14 between times $t_0$ and $t_1$ are each converted to a 12-bit signal and divided by a factor of one to take on the form XXXXXXXX0000. The next group of 8-bit samples sequentially recalled from the memory, representing the signal 14 between times $t_1$ and $t_2$, are each converted to 12-bit signals and divided by a factor of 2 to take the form XXXXXXX000. The subsequent groups of stored 8-bit samples, i.e. representing the signal 14 between times $t_2$–$t_3$, $t_3$–$t_4$ and subsequent of $t_4$, are similarly converted and divided by factors of 4, 8 and 16 respectively and therefore take the forms X00XXXXXXX00, X000XXXXXXX0 and X0000XXXXXXX. It will thus be seen that the resolution contributing bits of the samples representing the lower levels of signal 14 have been retained even though only an 8-bit memory has been utilized. While such has been accomplished at the expense of losing some resolution at the higher signal levels, this loss, in terms of auditory perception, is not especially noticeable.

A more detailed description of the invention will now be presented. For this purpose, the waveform of FIG. 1 has been redrawn in FIG. 2A with the signal 14 omitted for convenience. As previously explained, in carrying out the invention, the signal 14 modulated by envelope 12 is initially sequentially sampled at a plurality of equally spaced intervals to form a sequence of 12-bit words representing the waveform. The 12-bit samples are then grouped into five continuous portions identified in FIG. 2 as A, B, C, D and E. Portion A includes the 12-bit samples defined by the segment of envelope 12 extending between amplitudes A and A/2 while portion B includes the 12-bit samples defined by the segment of envelope 12 extending from amplitude A/2 to amplitude A/4. Portions C and D include the 12-bit samples defined by the segments extending between amplitudes A/8 and A/16, respectively. Portion E includes the remainder of the 12-bit samples defined by the segment of envelope 12 having an amplitude less than A/16. It will thus be observed that the 12-bit words or samples comprising portion E are all characterized by magnitudes not exceeding 1/16th the maximum amplitude A of the envelope 12 while the 12-bit words comprising portion D are all characterized by magnitudes not exceeding ⅛th of the maximum amplitude A. Similarly, the 12-bit samples characterizing portion C all have magnitudes not exceeding A/4 and the 12-bit samples comprising portion B all have magnitudes not exceeding A/2.

Assuming again, the use of modified sign magnitude notation, the 12-bit samples comprising the portions A–E may be represented in binary form as follows:

TABLE 1

| Portion 1 | 12-bit samples |
|---|---|
| A | XXXXXXXXXXXX |
| B | X0XXXXXXXXXX |
| C | X00XXXXXXXXX |
| D | X000XXXXXXXX |
| E | X0000XXXXXXX |

Each of the 12-bit samples is next multiplied by a suitable factor so as to shift the resolution contributing bits of the lower level signals to the most significant bit positions of the respective words. In more specific terms, the 12-bit samples comprising portion E are each multiplied by a factor of 16, i.e. shifted four places to the left, the 12-bit samples comprising portion D are multiplied by a factor of 8, i.e. shifted three places to the left, the samples comprising portion C by a factor of 4, i.e. shifted two places to the left, the samples comprising portion B by a factor of 2 and the samples comprising portion A by a factor of 1. The result of the foregoing multiplication operation is to modify the form of the 12-bit samples as set forth below:

TABLE 2

| Portion | Multiplier | 12-bit Products |
|---|---|---|
| A | 1 | XXXXXXXXXXXX |
| B | 2 | XXXXXXXXXXX0 |
| C | 4 | XXXXXXXXXX00 |
| D | 8 | XXXXXXXXX000 |
| E | 16 | XXXXXXXX0000 |

FIG. 2B graphically depicts the effect of the foregoing multiplication operation. It will be appreciated that each of the portions A–E now consists of 12-bit samples of comparable magnitudes. In preparation for storage in an 8-bit memory, the four least significant bits of each of the multiplied 12-bit samples is dropped. In effect, this corresponds to dividing each of the multiplied 12-bit samples by a factor of 16. As a result of this operation, none of the resolution contributing bits of the samples of portion E are lost while one, two, three and four resolution contributing bits of portions D, C, B and A respectively are lost. However, as discussed previously, the loss of resolution in the higher level signals is not an auditorially significant effect. The resulting 8-bit words, which are sequentially stored in a suitable 8-bit memory, take the form illustrated below:

TABLE 3

| Portion | 8-bit stored samples |
|---|---|
| A | XXXXXXXX |
| B | XXXXXXXX |
| C | XXXXXXXX |
| D | XXXXXXXX |
| E | XXXXXXXX |

Figure 3:
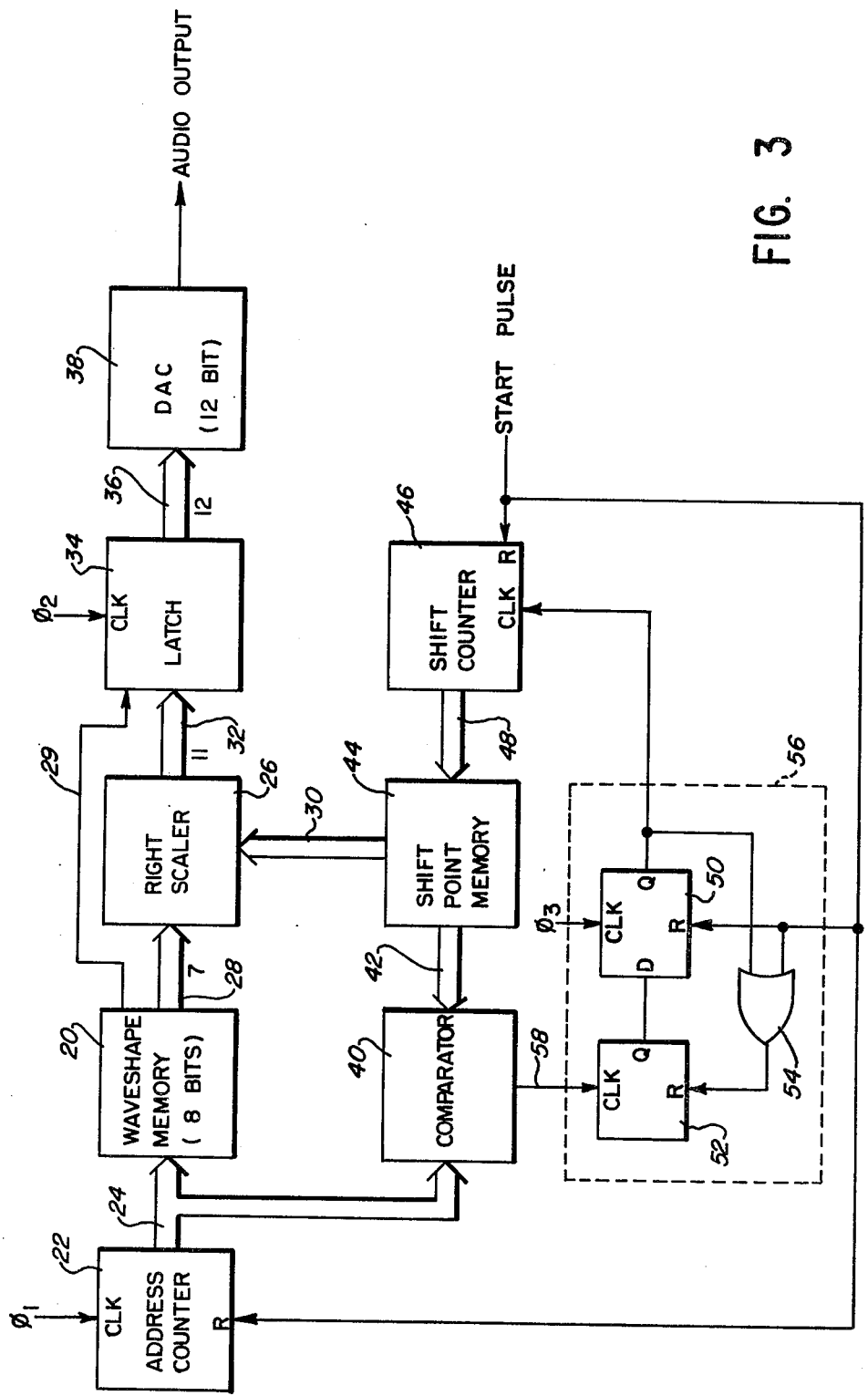
FIG. 3 shows, in a block diagram form, a circuit embodiment for reconstructing a sampled waveform according to the invention.

FIG. 3 illustrates a preferred embodiment of the playback circuit for reconstructing the signal 14 in terms of 12-bit words using the stored 8-bit samples. The circuit includes an 8-bit memory 20 in which is sequentially stored the 8-bit samples of the form represented in Table 3 above. Each of the stored 8-bit samples in the memory 20 has an associated address, which addresses incrementally increase as the envelope 12 decays. FIG. 2b illustrates, in an exemplary manner, the addresses of the 8-bit stored samples representing the signal 14 as shown in FIG. 1. In this example, the samples of the signal 14 occurring at times $t_0$, $t_1$, $t_2$, $t_3$ and $t_4$ are stored in the memory 20 at addresses 000, 300, 700, 1200 and 1600 respectively.

The waveshape memory 20 is addressed by an address counter 22 via an address bus 24, the address counter 22 being clocked by a clock signal $\phi_1$ (see FIG. 6). In response to address counter 22, the stored 8-bit words are read out of the memory 20, the seven magnitude characterizing bits being coupled to the seven inputs of a right shift scaler 26 by means of a 7 conductor output bus 28 and the sign bit being coupled to the most significant bit input of a 12-bit latch 34 by a conductor 29. Scaler 26, which may comprise a Signetics Model 8243 device, is connected for adding four logical 0 least significant bits to each 7-bit sample developed on bus 28 and for shifting each thusly formed 11-bit word a number of bit positions or places to the right in accordance with a binary selector code developed on an input control bus 30. The output of scaler 26 is coupled by an 11 conductor bus 32 to the 11 least significant bit inputs of the latch 34 which stores the data presented on bus 32 and conductor 29 in response to the rising edge of a clock signal $\phi_2$ (see FIG. 6). The output of the latch 34 is in turn coupled by a 12 conductor bus 36 to a 12-bit digital to analog converter 38 which develops an output analog signal representing the signal stored in the waveshape memory 20.

The address bus 24 is also coupled to one input of a comparator 40, a second input to the comparator 40 being supplied by a bus 42 connected to the output of a shift point memory 44. Shift point memory 44, which is addressed by a shift counter 46 over a bus 48, also develops the selector code on bus 30 for controlling the operation of scaler 26.

The Q output of a flip-flop 50, which forms together with a second flip-flop 52 and an OR gate 54 a one and only one pulse generator 56, is connected to the clock input of the shift counter 46 and to a first input of the OR gate 54. A start pulse (see FIG. 6) is coupled to the reset inputs of counters 22 and 46 and also to the reset input of flip-flop 50 and the second input of OR gate 54. The output of OR gate 54 is coupled to the reset input of flip-flop 52 whose clock input is supplied by a conductor 58 connected to the control output of comparator 40. The Q output of flip-flop 52 is connected to the D input of flip-flop 50, flip-flop 50 being clocked in response to a clock signal $\phi_3$ (see FIG. 6).

The method of programming shift point memory 44 is illustrated in FIG. 4. The first column of the table of FIG. 4 represents the memory address locations of the memory 44. The last two columns represent the data stored in the memory at the associated memory locations. In general terms, the data stored at each memory address location defines a particular one of the portions A–E of the envelope 12 together with the selector code for properly operating scaler 26 in response to the associated portion A–E. Thus, the data stored at memory address location 000 represents portion A of envelope 12 (addresses 000–301) together with an associated selector code of 000 representing a shift of zero places to the right. The data stored at memory address location 001 represents portion B of the envelope 12, (addresses 301-700) and a selector code of 001 (representing a shift of one place to the right). The data stored at memory address location 010 and 011 represent portions C (addresses 701-1200) and D (addresses 1201-1600) and selector codes 010 and 011, representing shifts of 2 and 3 places to the right respectively. Finally, the data stored at memory address location 100 represents portion E, address 2500 being greater than the largest address developed on bus 24, of envelope 12 and selector code 100 which corresponds to a shift of 4 places to the right.

Operation of the circuit of FIG. 3 is initialized by generating a start pulse for resetting counters 22 and 46 together with flip-flops 50 and 52. Address counter 22 will subsequently begin sequentially coupling address signals starting with address 000 to memory 20 over bus 24. The 7 magnitude representing bits of the stored 8-bit samples comprising portion A of the envelope 12 are, in response, sequentially coupled to the scaler 26 over the 7 conductor bus 28. At the same time, the address signals are also coupled by bus 24 to the first input of comparator 40. Since the state of shift counter 46 is 000, the counter having been reset by the start pulse, the output of the shift point memory 44 developed on bus 42 represents address 301 and the output on bus 30 comprises a selector code of 000. As a consequence, the control output of comparator 40 is logically low and the scaler 26 is operative for developing a series of 11-bit signals on output bus 32 having the form XXXXXXX0000. These 11-bit signals together with the associated sign bits developed on conductor 29 are repetitively stored in latch 34 and converted to a corresponding analog signal representing portion A of the signal 14 by digital to analog converter 38.

When the address developed on bus 24 reaches address 301, comparator 40 develops an equality pulse on conductor 58 clocking flip-flop 52 whose Q output goes to logical 1. Flip-flop 50 is thereby enabled for coupling a $\phi_3$ clock pulse for clocking the shift counter 46 and for resetting flip-flop 52. The address signal developed on bus 48 of the shift counter 46 is therefore incremented for addressing memory location 001 of the shift point memory 44 such that address 701 is coupled to comparator 40 over bus 42 and selector code 001 is coupled to scaler 26 over bus 30. In this manner, each of the stored samples representing portion B of the waveform are developed on output conductor 32 as an 11-bit signal having the form 0XXXXXXX000. The 11-bit signals, together with the associated sign bits developed on conductor 29, are repetitively stored in latch 34 and coupled to converter 38 for constructing an analog signal representing portion B of the signal 14.

The foregoing process is repeated each time the address signal developed on bus 24 attains a value equal to the address developed on output bus 42 of the shift point memory 44. Therefore, when the address developed on bus 24 reaches the value 701, comparator 40 develops another equality pulse on output conductor 58 resulting in the development of another $\phi_3$ clock pulse clocking the shift counter 46. The address signal developed on bus 48 of the shift counter 46 is therefore again incremented for addressing memory location 010 of the shift point memory 44. Bus 42 now couples address 1201 to the comparator 40 and bus 30 couples selector code 010 to the scaler 26. The subsequently developed 12-bit samples coupled to the latch 34 over bus 32 and conductor 29 (representing portion C of envelope 12) consequently have the form X00XXXXXXX00. The circuit of FIG. 3 responds in a similar manner when the address signal developed on the bus 24 achieves the value of 1201. In this case, the output developed on bus 42 is incremented to 1601 and the selector code developed on bus 30 to 011. A series of 12-bit samples comprising portion D of the waveform are therefore coupled to latch 34 having the form X000XXXXXXX0. The next and final equality pulse developed by the comparator 40 occurs in response to the address signal developed on bus 24 assuming the value 1601. This causes the selector code for portion E of the waveform to assume a value 100 for causing the scaler 26 to couple 11-bit signals having the form 0000XXXXXXX to latch 34. The 11-bit signals, together with the associated sign bits developed on conductor 29, are repetitively stored in the latch 34 and presented to the converter 38 for reconstructing portion E of the waveform. The reconstructed portions A-E of the signal 14 are represented by the envelope illustrated in FIG. 2c.

It will be seen from the foregoing that the 8-bit samples stored in the memory 20 are reconstructed as 12-bit samples on the bus 36 with each of the 12-bit samples being properly scaled in conformity with their counterparts ennumerated in Table 1 above. While some of the resolution contributing bits of the higher level signals have been lost, the resolution contributing bit of lower level signals have all been retained such that the average signal to noise ratio for the samples comprising portions A-E remains constant. For purposes of convenience, the form of the 12-bit signals appearing on bus 36 for application to converter 38 are tabulated below:

TABLE 4

| Portion | 12-bit samples |
|---------|----------------|
| A | XXXXXXXX0000 |
| B | X0XXXXXXX000 |
| C | X00XXXXXXX00 |
| D | X000XXXXXXX0 |
| E | X0000XXXXXXX |

It has been assumed in the foregoing discussion that modified sign magnitude notation is being exclusively used to describe the 12 and 8-bit samples throughout the system. Certain functions in the circuit of FIG. 3 may, however, be more readily and inexpensively accomplished using binary offset notation. Thus, for example, it may be desired to store the 8-bit samples in memory 20 in binary offset form, to process the stored samples through scaler 26 using sign magnitude notation and to operate converter 38 in response to 12-bit signals specified in binary offset notation.

A convenient circuit for converting a binary signal coded according to one notation to a binary signal coded in the other notation is illustrated in FIG. 5. The circuit comprises a first input terminal 70 connected through an inverter 72 to the first inputs of a plurality of EXCLUSIVE OR gates 74. The second inputs of gates 74 are each connected to a respective one of a plurality of input terminals 76. The converted binary signal is developed on a plurality of output conductors 78 comprising the outputs of gates 74 together with a conductor connected to the input terminal 70.

A waveform is coded using binary offset notation by assigning the negative full scale value of the waveform a 0 value code and the positive full scale value of the waveform a maximum value code. Thus in a 4-bit system, the negative full scale value of the waveform would be encoded as 0000 and the positive full scale would be encoded as 1111. Waveform values between the negative and positive full scale values are coded in incrementally increasing steps from 0000 to 1111 so that, for example, a waveform value of 0 would be encoded as 1000. Referring now to FIG. 5, assume that it is desired to convert a 4-bit binary offset encoded signal to a 4-bit modified sign magnitude encoded signal. The most significant bit of the binary offset encoded signal is coupled to input terminal 70 while the 3 least significant bits are each coupled to a respective one of the input terminals 76. The corresponding modified sign magnitude notation 4-bit signal is consequently developed on output conductors 78 with the sign bit being developed on the conductor connected to input terminal 70. Consider, for example, the case of a simple sine wave whose negative peak value may be represented in binary offset notation by the code 0000. It will be observed that coupling this code to the inputs of the converter of FIG. 5 results in the development of a code on output conductors 78 of the form 0111 which is the proper representation for the negative peak value of the sine wave in modified sign magnitude notation.

The circuit of FIG. 5 is also operable for converting modified sign magnitude notation codes to corresponding binary offset notation codes. Using the previous example, it will therefore be seen that coupling the code 0111, representing the negative peak value of the sine wave in modified sign magnitude notation, to the input of the circuit of FIG. 5 with the 0 sign bit being coupled to input terminal 70 results in the development of a code on output conductors 78 of the form 0000 which is the proper representation for the negative peak value of the sine wave in binary offset notation.

The techniques of the present invention have heretofore been described in terms of a preferred embodiment wherein an 8-bit memory is used to store a sequence of previously tabulated 12-bit samples for achieving an effective signal to noise ratio which remains constant for the entire sequence of samples. It will be recognized, however, that the invention is not limited to this specific embodiment and that other sets of parameters may likewise be employed. In general terms, if a p-bit memory is used and the samples are originally tabulated in terms of a sequence of n-bit binary words, where n is greater than p, the sequence should be grouped into a plurality of portions $A_o$–$A_m$ equal in number to n-p+1, where m takes on consecutive integer values beginning with 0. The portions $A_o$–$A_m$ each represent a segment of the envelope of the sampled signal having normalized values ranging between $\frac{1}{2}^m$ and $\frac{1}{2}^{m+1}$. Thus, portion $A_0$ includes the n-bit samples located between normalized amplitudes 1 and $\frac{1}{2}$ of the envelope, portion $A_1$ includes the n-bit samples located between normalized amplitudes $\frac{1}{2}$ and $\frac{1}{4}$ of the envelope, and so on. Each of the n-bit binary samples of the portions $A_o$–$A_m$ is then shifted m places to the left and the p most significant bits of each shifted n-bit sample is stored in the memory. In other words, the n-bit samples of portion $A_0$ are shifted 0 places to the left with the resulting p most significant bits being stored in the memory, the n-bit samples of portion $A_1$ are shifted 1 place to the left with the resulting p most significant bits being stored in the memory, the n-bit samples of portion $A_2$ are shifted 2 places to the left with the resulting p most significant bits being stored in the memory, and so on. The sequence is reconstructed by sequentially reading the p-bit words from the memory and converting each stored word to an n-bit word by adding n-p zero value least significant bits to each p-bit word and then shifting each resulting n-bit word m places to the right. As such, the stored p-bit words of portion $A_0$ are formed as n-bit words having n-p zero value least significant bits, the resulting n-bit words being shifted 0 places to the right. Similarly, the stored p-bit words of portion $A_1$ are formed as n-bit words having n-p zero value least significant bits, the resulting n-bit words being shifted one place to the right, and so on. The latter operation, i.e. reconstruction of the sequence, may also be considered as shifting the p-bit stored words of each portion $A_0$–$A_m$ by n-p-m places to the left. In this case, the p-bit samples of portion $A_o$ are converted to n-bit samples by shifting n-p places to the left which is the equivalent of adding n-p zero value least significant bits. Similarly, the p-bit samples of portion $A_1$ are converted to n-bit samples by shifting n-p-1 places to the left, the equivalent of adding n-p zero value least significant bits and shifting one place to the right, and so on.

It will be apparent that other changes and modifications may be made in the invention without departing therefrom in its broader aspects. The aim of the appended claims, therefore, is to cover all such changes and modifications as fall within the true spirit and scope of the invention.

What is claimed is:

1. The method of forming a binary representation of an analog waveform of the type having a gradually decaying or increasing envelope comprising the steps of:
   sampling said waveform for producing a sequence of n-bit binary samples representative thereof;
   sequentially storing in a memory a predetermined number of the resolution contributing bits of each of said n-bit samples, said predetermined number being less than n;
   sequentially recalling said stored samples from said memory; and
   scaling each of said recalled samples for conversion to an n-bit signal having a magnitude corresponding to the magnitude of the associated n-bit sample.

2. The method of claim 1 wherein said sampling step comprises sampling said waveform at a plurality of equally spaced intervals.

3. The method of claim 1 wherein said storing step comprises:
   shifting at least some of said n-bit samples a number of places to the left such that the p most significant bit positions of each of said samples is characterized by resolution contributing bits; and
   storing the p most significant bits of each of said samples.

4. The method of claim 3 wherein said scaling step comprises shifting each of said recalled samples a number of places such that each of said recalled samples has a magnitude corresponding to the magnitude of its associated n-bit sample.

5. The method of forming a digital representation of a waveform having a gradually decaying or increasing envelope comprising the steps of:
   sampling said waveform for producing a sequence of n bit binary samples representative thereof;
   grouping said sequence into first and second continuous portions, said second portion comprising that portion of said sequence in which none of said n bit binary samples have a magnitude exceeding $\frac{1}{2}^m$ the magnitude of the largest of said n-bit samples, where m is an integer greater than zero;

shifting each binary sample of said second portion m places to the left;

storing the p most significant bits of each of the n-bit binary samples of said first and second portions; and reconstructing said sequence by recalling from storage each of said stored binary samples and converting it to its corresponding n-bit binary sample by shifting each recalled sample of said first portion n-p places to the left and each recalled sample of said second portion n-p-m places to the left.

6. The method of claim 5 wherein:

said grouping step further comprises grouping said second portion of said sequence into third and fourth continuous portions, said fourth portion comprising that portion of said second portion in which none of said n-bit binary samples have a magnitude exceeding $\frac{1}{2}^{m+q}$ times the magnitude of the largest of said n-bit binary samples, where q is an integer greater than zero;

said shifting step further comprising shifting each binary sample of said third portion m places to the left and each binary sample of said fourth portion m+q places to the left; and said reconstructing step further comprising reconstructing said sequence by recalling from storage each of said stored binary samples and converting it to its corresponding n-bit binary sample by shifting each recalled word of said third portion n-p-m places to the left and each recalled word of said fourth portion n-p-m-q places to the left.

7. A method utilizing a p bit memory for forming a digital representation of a waveform having a gradually decaying or increasing envelope comprising the steps of:

forming a representation of said waveform in terms of a corresponding sequence of n-bit binary words, where n is an integer greater than p;

grouping said sequence into a plurality of continuous portions Ao-Am equal in number to n-p+1, each of said portions representing a segment of said envelope having normalized amplitudes ranging between $\frac{1}{2}^m$ and $\frac{1}{2}^{m+1}$, where m takes on consecutive integer values beginning with zero;

shifting each binary word of each of said portions Ao-Am m places to the left;

storing the p most significant bits of each of said n-bit binary words in said memory; and reconstructing said sequence by recalling from storage each of said stored binary words and converting it to its corresponding n bit binary word by shifting each recalled word of each of said portions $A_o$-$A_m$ (n-p-m) places to the left.

8. The method of claim 7 wherein n=12, p=8 and m takes on the consecutive integer values 0,1,2 and 3.

9. Apparatus for forming a digital representation of a waveform having a gradually decaying or increasing envelope comprising:

a first memory sequentially storing a predetermined number p of resolution contributing bits of each of a sequence of n-bit binary words, said sequence comprising a digital represenation of said waveform;

means for developing an address signal for sequentially addressing said first memory; and means responsive to said first memory and to said addressing means for converting each addressed p-bit binary word stored in said first memory to an n-bit word having a magnitude corresponding to the magnitude of the associated n-bit word of said sequence.

10. Apparatus according to claim 9 wherein said means for converting comprises:

a second memory sequentially storing a plurality of address values representing the addresses of said first memory which correspond to stored binary words representing normalized amplitudes of said envelope having values of $\frac{1}{2}^m$, where m takes on consecutive integer values beginning with one;

comparator means responsive to said addressing means and to said second memory for incrementally addressing said second memory in response to one of said stored p-bit binary words corresponding to said address signal; and scaling means responsive to said first and second memories for developing said converted n-bit words.

11. The apparatus according to claim 10 wherein said means for scaling comprises means for shifting each of said stored binary words (n-p-q) places to the left, where q is an integer initially having a value of zero and being consecutively incremented in response to equality determinations by said comparator means.

12. The apparatus according to claim 11 wherein said second memory means is programmed for storing, in association with each of said stored address values, the corresponding value for the integer q in terms of a binary selector code, said means for scaling being responsive to said stored p-bit words and to said selector codes.

13. The apparatus according to claim 10 wherein said second memory means is programmed for storing a binary selector code in association with each of said sequentially stored address values, said binary selector codes sequentially having values defined by the expression (m−1).

14. The apparatus according to claim 13 wherein said scaling means comprises means for adding n-p zero value least significant bits to each of said stored p-bit words and for shifting each resulting n-bit word (m−1) places to the right.

* * * * *